P. BEAUSHENE AND E. LYSEN.
AMUSEMENT DEVICE.
APPLICATION FILED DEC. 6, 1918.

1,331,411.

Patented Feb. 17, 1920.
2 SHEETS—SHEET 1.

Witnesses
J. M. Jester

Inventor
P. Beaushene
E. Lysen
By Victor J. Evans
Attorney

P. BEAUSHENE AND E. LYSEN.
AMUSEMENT DEVICE.
APPLICATION FILED DEC. 6, 1918.
1,331,411.
Patented Feb. 17, 1920.
2 SHEETS—SHEET 2.
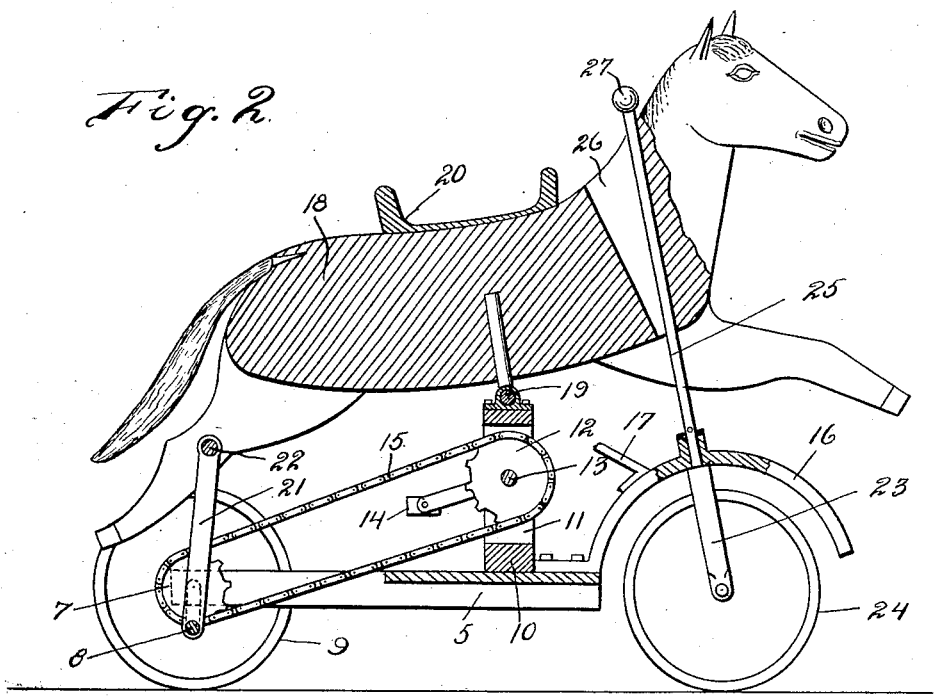
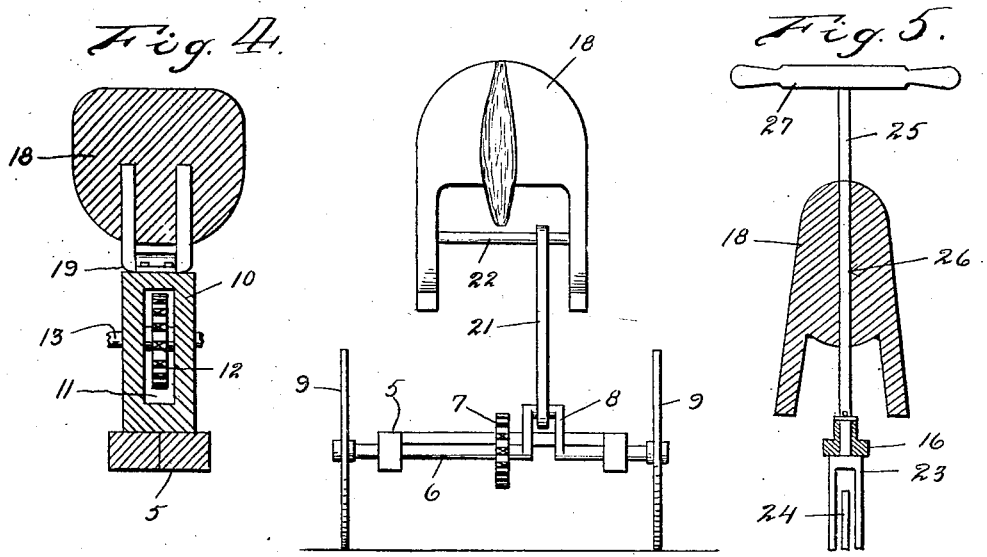
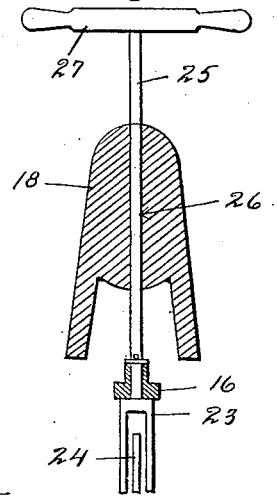
Witnesses
J. M. Jester
Inventor
P. Beaushene
E. Lysen
By Victor J. Evans
Attorney

UNITED STATES PATENT OFFICE.

PETER BEAUSHENE AND ERNEST LYSEN, OF SEATTLE, WASHINGTON.

AMUSEMENT DEVICE.

1,331,411. Specification of Letters Patent. Patented Feb. 17, 1920.

Application filed December 3, 1918. Serial No. 265,567.

*To all whom it may concern:*

Be it known that we, PETER BEAUSHENE and ERNEST LYSEN, citizens of the Dominion of Canada and the United States, respectively, residing at Seattle, in the county of King and State of Washington, have invented new and useful Improvements in Amusement Devices, of which the following is a specification.

This invention relates to amusement devices, and has for its object the provision of an amusement device which is in the nature of a combined velocipede and rocking horse, the device being pedal propelled along the ground by an operator seated upon the horse portion, the horse being given a rocking movement by connection with the driving shaft.

An important object is the provision of a device of this character which is provided with a steering wheel operated by a handle bar disposed within convenient reach of the rider.

Another object is the provision of a device of this character which is provided with a platform portion upon which the operator stands preparatory to mounting the horse.

A further object is the provision of a device of this character which will be comparatively simple and inexpensive in manufacture, which will be very entertaining in use, durable in service, and a general improvement in the art.

With the above and other objects and advantages in view, the invention consists in the details of construction to be hereinafter more fully described and claimed and illustrated in the accompanying drawings, in which—

Figure 1:
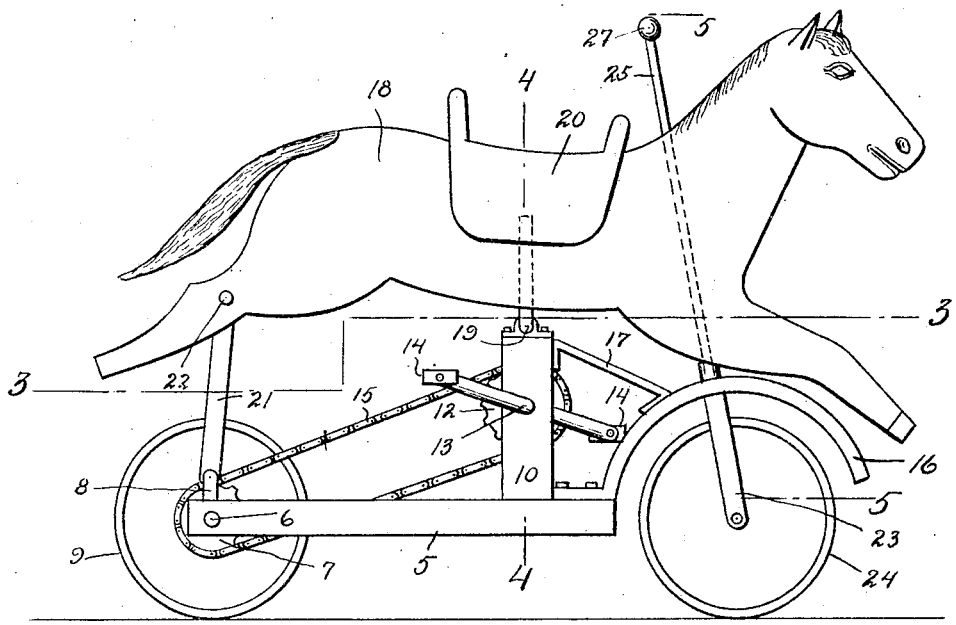
Figure 3:
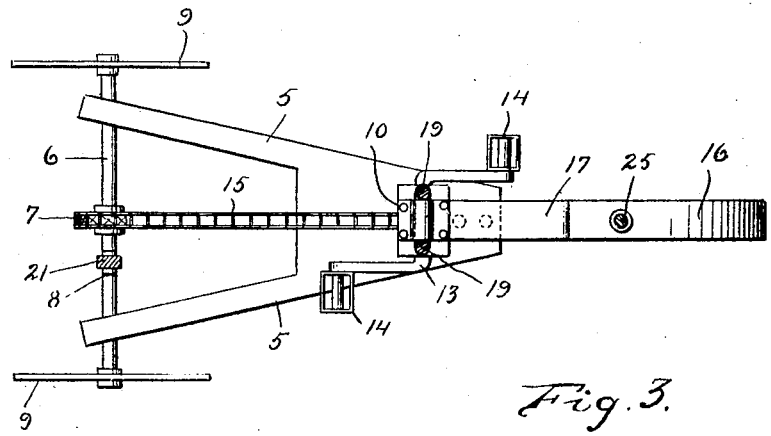

Figure 1 is a side elevation of the device with the horse shown in one position, Fig. 2 is a longitudinal sectional view with the horse shown in its opposite position, Fig. 3 is a horizontal sectional view on the line 3—3 of Fig. 1, Fig. 4 is a detail central cross sectional view, Fig. 5 is a detail cross sectional view taken through the steering fork, and Fig. 6 is a rear elevation.

Referring more particularly to the drawings, the numeral 5 designates a V-shaped frame which forms the supporting platform of the device. Journaled through the rear ends of the arms of the frame 5 is the drive axle 6 upon which is secured a sprocket 7 and which is provided with a crank portion 8. Disposed upon the ends of the axle 6 are wheels 9, one being fast and the other loose, as is the common practice.

Rising from the forward portion of the frame 5 is an upright 10 which has its central portion cut away to provide a recess 11 within which is disposed a sprocket 12 secured upon the crank shaft 13 which has its ends provided with pedals 14. A chain 15 is trained about the sprockets 7 and 12.

Secured upon the forward end of the frame 5 is an upwardly and forwardly curved bar 16 which is reinforced by a pair of diagonal braces 17, one of which extends to the top portion of the upright 10.

The body of the device is designated by the numeral 18 and is formed in the shape of a horse, this body being pivoted at 19 upon the upper end of the upright 10. The body 18 is of course provided with a suitable seat or saddle 20 upon which the operator seats himself when riding. Connected with the crank portion 8 of the rear axle 6 is a pitman 21 which is pivotally connected at 22 with the body of the horse adjacent the rear portion thereof.

Journaled to the curved bar 16 is a fork 23 within which is journaled a steering wheel 24 and to which is secured an upwardly extending rod 25 passing through a guide slot 26 in the body 18 and provided at its upper end with the handle bar 27.

In the use of the device a child or other operator initially steps upon the platform or frame 5 and then mounts the horse in the ordinary manner, disposing himself upon the seat 20. He then places his feet upon the pedals 14 and also grasps the handle bar 27. By means of the pedals 14 the crank shaft 13 is rotated whereupon by virtue of the chain and sprocket connection, the rear axle 6 will be rotated and the device consequently propelled along the ground or other surface. By turning the handle bar 27 in the desired direction, the course of travel may be varied at will. As the device is traveling the rotation of the rear axle 6 will cause the crank portion 8 thereof to move the pitman 21 which will consequently effect a rocking movement of the horse or body upon its pivot 19.

From the foregoing description and a study of the drawings it will be apparent that we have thus provided an extremely simple device which will be very entertaining in use, which will be also free from danger, and which will be a manifest improvement in the art.

While we have shown and described the preferred embodiment of the invention, it will be of course understood that we reserve the right to make such changes in the form, construction, and arrangement of parts as will not depart from the spirit of the invention nor the scope of the subjoined claim.

Having thus described our invention, what we claim is:

A device of the character described comprising a supporting frame, a platform thereon, a crank shaft journaled at one end of the frame and carrying wheels, a standard rising from the intermediate portion of said platform and provided with an opening, a sprocket journaled within said opening, pedals connected with said sprocket, a sprocket on said crank shaft, a chain trained about said sprockets, a U-shaped yoke journaled upon the top of said standard, a body formed to represent a horse secured upon said yoke, a pitman connected with said crank shaft and said body, a forwardly and upwardly curved bar secured upon the forward end of said frame, and a wheel carrying fork journaled through said bar and carrying a handle at its upper end.

In testimony whereof we affix our signatures.

PETER BEAUSHENE.
E. LYSEN.